US011308364B1

(12) United States Patent
Herman et al.

(10) Patent No.: US 11,308,364 B1
(45) Date of Patent: Apr. 19, 2022

(54) AUTOMATIC BENCHMARKING OF LABELING TASKS

(71) Applicant: Scale AI, Inc., San Francisco, CA (US)

(72) Inventors: Nathaniel John Herman, San Francisco, CA (US); Akshat Bubna, San Francisco, CA (US); Alexandr Wang, San Francisco, CA (US); Shariq Shahab Hashme, San Francisco, CA (US); Samuel J. Clearman, San Francisco, CA (US); Liren Tu, Danville, CA (US); Jeffrey Zhihong Li, San Francisco, CA (US); James Lennon, San Francisco, CA (US)

(73) Assignee: SCALE AI, INC., San Francisco, CA (US)

( * ) Notice: Subject to any disclaimer, the term of this patent is extended or adjusted under 35 U.S.C. 154(b) by 25 days.

(21) Appl. No.: 16/730,840

(22) Filed: Dec. 30, 2019

(51) Int. Cl.
*G06K 9/62* (2006.01)
*G06N 20/00* (2019.01)

(52) U.S. Cl.
CPC ......... *G06K 9/6263* (2013.01); *G06K 9/6231* (2013.01); *G06K 9/6257* (2013.01); *G06K 9/6284* (2013.01); *G06N 20/00* (2019.01)

(58) Field of Classification Search
None
See application file for complete search history.

(56) References Cited

U.S. PATENT DOCUMENTS

| 2009/0204637 A1* | 8/2009 | Li ..................... G06F 16/5862 |
| 2014/0029839 A1* | 1/2014 | Mensink ............. G06K 9/6272 382/159 |
| 2019/0102606 A1* | 4/2019 | Nowozin ................. G06N 5/04 |
| 2020/0161005 A1* | 5/2020 | Lyman ................ G06K 9/3233 |

\* cited by examiner

*Primary Examiner* — Emily C Terrell
*Assistant Examiner* — Nathan J Bloom
(74) *Attorney, Agent, or Firm* — Artegis Law Group, LLP (57) ABSTRACT

One embodiment of the present invention sets forth a technique for evaluating labeled data. The technique includes selecting, from a set of labels for a data sample, a subset of the labels representing non-outliers in a distribution of values in the set of labels. The technique also includes aggregating the subset of the labels into a benchmark for the data sample. The technique further includes generating, based on a comparison between the benchmark and an additional label, a benchmark score associated with the data sample, and generating a set of performance metrics for labeling the data sample based on the benchmark score.

18 Claims, 6 Drawing Sheets

AUTOMATIC BENCHMARKING OF LABELING TASKS

BACKGROUND

Field of the Various Embodiments

Embodiments of the present disclosure relate generally to labeling of data for machine learning, and more particularly, to benchmarking of labeling tasks.

Description of the Related Art

Advances in the field of machine learning and increases in available computing power have led to a proliferation in the applications of machine learning. Many machine learning models, including deep neural networks, require large amounts of labeled data to train and verify. Such labeled data typically includes samples that have been tagged with labels. For example, labeled images in which the classifications and locations of objects (e.g., people, cars, etc.) have been tagged may be used to train a machine learning model to perform object classification and localization.

Labeled data can be obtained by relying on human judgment to tag data with appropriate labels. However, such manual labeling of data is time consuming and labor intensive, and few traditional tools exist to facilitate the process of labeling data.

In addition, manually generated labels vary in accuracy and quality, which in turn affects the performance of machine learning models trained and/or validated using the labels. For example, images, text, and/or other data may be provided to a large number of people, along with instructions for generating specific types of labels from the data. As a result, labels produced by multiple people for the same task can differ, depending on the complexity of the instructions, how each person interprets the instructions, the amount of labeling experience the person has, and/or other factors.

As the foregoing illustrates, what is needed in the art are techniques for evaluating and improving labeling quality.

SUMMARY

One embodiment of the present invention sets forth a technique for evaluating labeled data. The technique includes selecting, from a set of labels for a data sample, a subset of the labels representing non-outliers in a distribution of values in the set of labels. The technique also includes aggregating the subset of the labels into a benchmark for the data sample. The technique further includes generating, based on a comparison between the benchmark and an additional label, a benchmark score associated with the data sample, and generating a set of performance metrics for labeling the data sample based on the benchmark score.

By automatically generating benchmarks from existing labels, evaluation of labeling performance can scale with the number of users involved in labeling tasks and/or the types of labeling tasks or projects. Moreover, continuous evaluation of the users' labeling performance and adjustment of the users' labeling tasks based on the labeling performance improve the quality and accuracy of the labels. In turn, machine learning models that are trained or validated using the labels have better performance and/or faster convergence than machine learning models that are trained or validated using noisy and/or inaccurate labels. Consequently, the disclosed techniques provide technological improvements in the generation of labeled data for machine learning and/or the training, validation, and execution of machine learning models.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
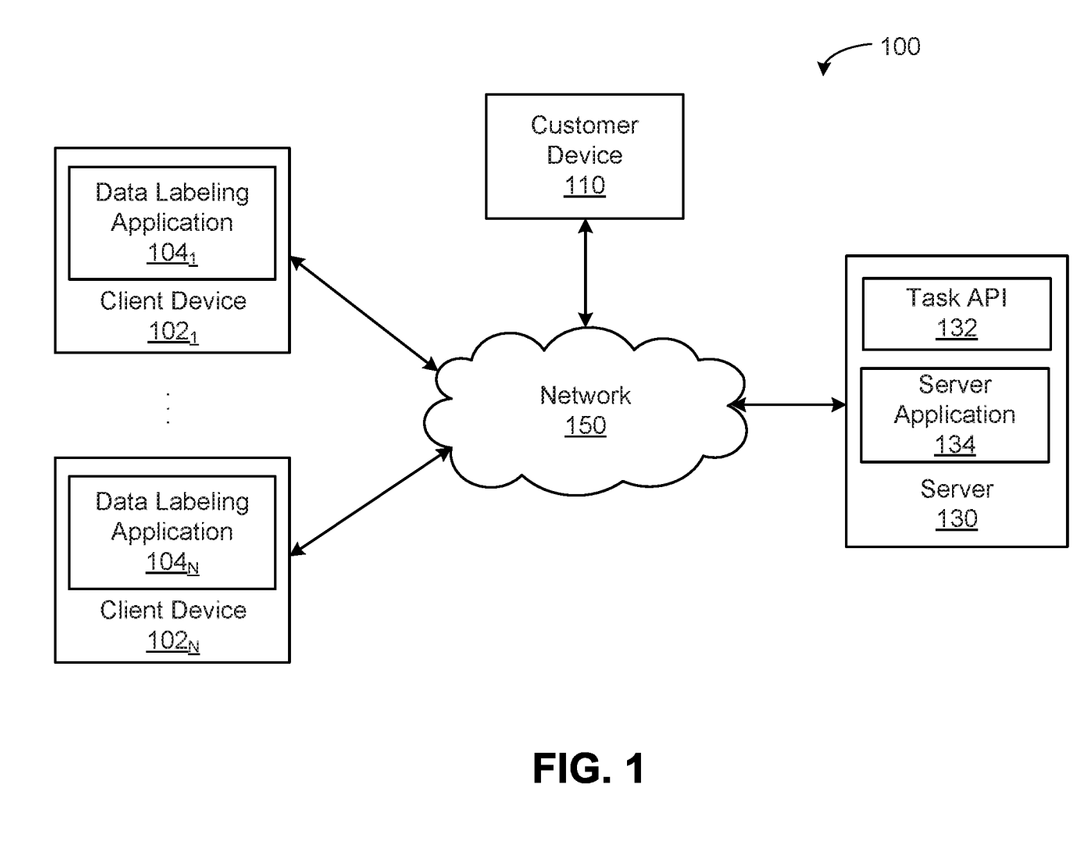
FIG. 1 is a conceptual illustration of a system configured to implement one or more embodiments.

FIG. 1 illustrates a system 100 configured to implement one or more aspects of the present disclosure. As shown, system 100 includes, without limitation, a server computing device 130 (also referred to herein as "server 130") and a number of client devices $102_{1-N}$, each of which is referred to individually herein as a client device 102. Server 130 and client devices $102_{1-N}$ interoperate to facilitate data labeling by users of client devices $102_{1-N}$ in response to a customer request. Server 130, client devices $102_{1-N}$, and a customer device 110 communicate via a network 150, which may be a wide area network (WAN) such as the Internet, a local area network (LAN), or any other suitable network. Although a single server 130 and customer device 110 are shown for illustrative purposes, system 100 may generally include any number of servers, customer devices, and client devices, each of which may be a physical computing system or a virtual computing system running in, e.g., a data center or cloud.

Illustratively, server 130 exposes a task application programming interface (API) 132 that allows customers to send data and data labeling requests, via API calls. Any suitable data and labeling requests may be transmitted via such API calls to server 130. For example, in the context of autonomous vehicles, photographic, LIDAR (light detection and ranging), and/or radar (radio detection and ranging) data captured by vehicle-mounted sensors may be uploaded from customer device 110 to the server 130, along with a request that particular types of objects (e.g., vehicles, bicycles, pedestrians, etc.) be tagged in such data. GPS (global positioning system) data may also be uploaded and may be included in LIDAR data.

In some embodiments, a server application 134 executing on server 130 requires the data and data labeling requests submitted via API calls to satisfy predefined restrictions. For example, restrictions may exist on which classes (e.g., vehicles, pedestrians, buildings, etc.) of objects can be labeled, the format and size of the data, etc.

Server application 134 processes data received via task API 132 and sends the processed data to data labeling applications $104_{1-N}$ running in client devices $102_{1-N}$, along with indications of data labeling tasks to be performed by users of client devices $102_{1-N}$, based on the customer's request. Any suitable processing of received data may be performed by server application 134. For example, in some embodiments, server application 134 could convert photographic, LIDAR, or radar data received in different formats to a single format that data labeling applications $104_{1-N}$ can read and process. In another example, server application 134 could compress the received data to a smaller size. Although server application 134 is shown as a single application for illustrative purposes, it should be understood that the functionality of server application 134 may be performed by multiple applications or other types of software in alternative embodiments.

Each of data labeling applications $104_{1-N}$, referred to individually herein as a data labeling application 104, digests and renders data received from server application 134 for display via a user interface (UI). In some embodiments, data labeling application 104 may render one or more colored point clouds for visualizing three-dimensional (3D) data (e.g., LIDAR and/or radar data), while permitting users to navigate and view the point clouds from different perspectives. For example, in some embodiments, data labeling application 104 may use down sampling to obtain an aggregated point cloud that includes only points conveying the most information. In another example, data labeling application 104 could, based on a user specification, blend point cloud colorings derived from different data sources (e.g., photographic, label, and/or LIDAR intensity data). In addition to displaying rendered point clouds via a UI, data labeling application 104 may also display photographs associated with those point clouds at the same time.

In some embodiments, data labeling application 104 provides tools to facilitate data labeling tasks. For example, the tools could allow a user to draw annotations in the form of cuboids, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
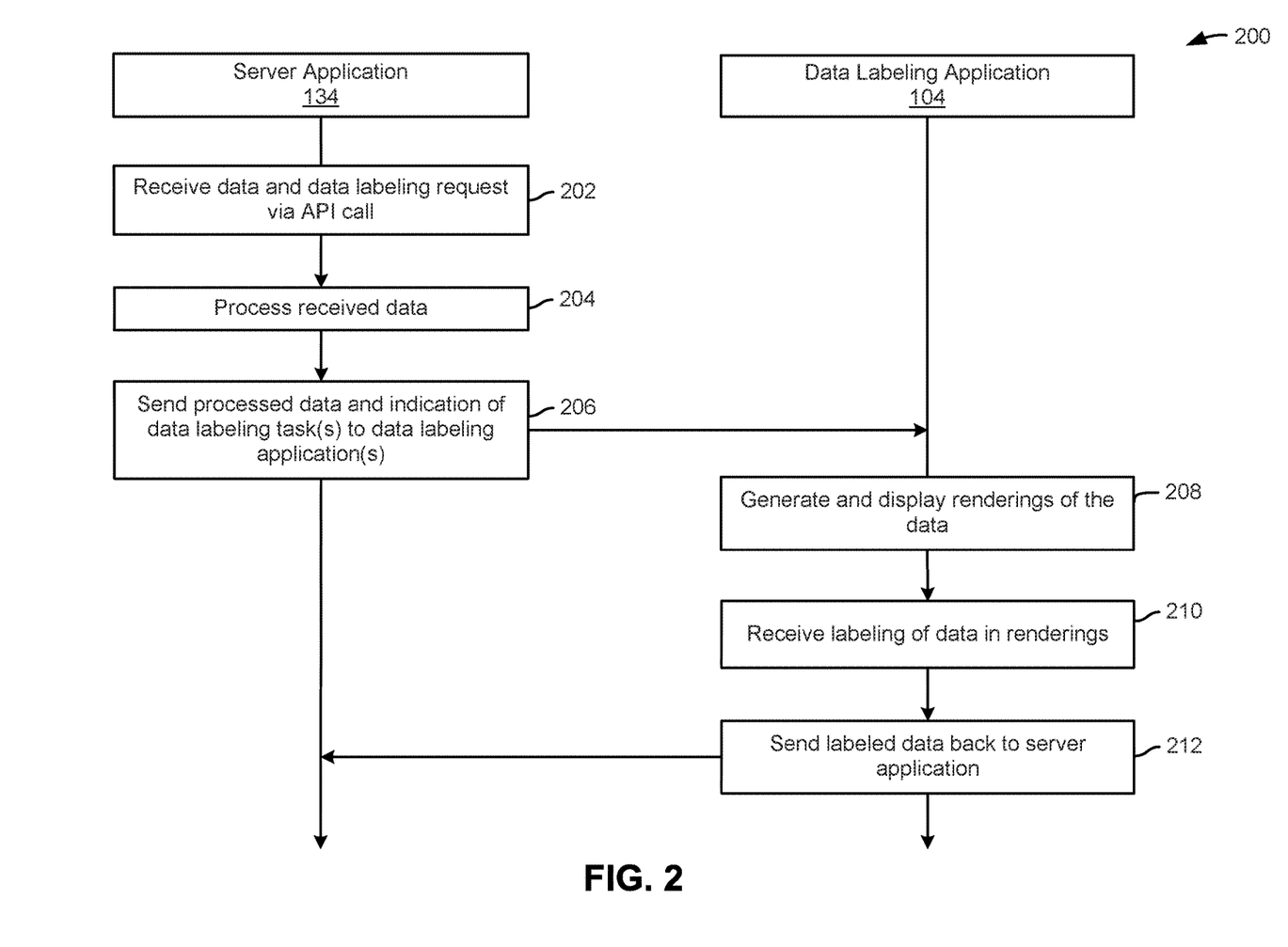
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where server application 134 receives data and a corresponding data labeling request via an API call. The data may be in any suitable format acceptable to server application 134. For example, server application 134 may need data to be sent in one or more JavaScript Object Notation (JSON) files. Similarly, the data labeling request may need to satisfy certain restrictions, such as which classes (e.g., vehicles, pedestrians, buildings, etc.) of objects can be labeled.

At step 204, server application 134 processes the received data. Any suitable processing may be performed by server application 134. In some embodiments, the processing may include compressing the received data and/or converting the received data into a format that can be read by data labeling application(s). For example, the received data could be converted to a data format in which points of a 3D point cloud are represented in a list as (x, y, z) coordinates with associated time stamps.

At step 206, server application 134 sends the processed data and an indication of data labeling task(s), based on the received request, to one or more data labeling applications. Although one data labeling application 104 is shown for illustrative purposes, it should be understood that server application 134 may send the processed data and indication of data labeling task(s), via a network, to any number of data labeling applications running on different client devices.

At step 208, a data labeling application 104 generates and displays renderings of the received data. For example, data labeling application 104 may display rendered point cloud(s) via a UI that permits a user to navigate and view the point cloud(s) from different perspectives. The UI may also, or instead, display text and/or images, and data labeling application 104 may provide tools to facilitate labeling of the rendered point cloud(s), text, images, and/or other data via the UI.

At step 210, data labeling application 104 receives labeling of data in the renderings. For example, the user could look around a two-dimensional (2D) or 3D scene, identify objects of interest, use a mouse to indicate where those objects are located, use the mouse and a keyboard to precisely size cuboids or bounding boxes around the objects, etc. In such a case, the user may further navigate forward and/or backwards in time to see where the objects move over time, and label the objects in every frame that is associated with a distinct point in time. As described, data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, data labeling application 104 sends the labeled data back to server application 134. The labeled data may be sent to server application 134 via a network, such as the Internet, and server application 134 may then return the labeled data to the customer. In some embodiments, optional verification and/or other processing may be performed prior to returning labeled data to the customer.

Figure 3:
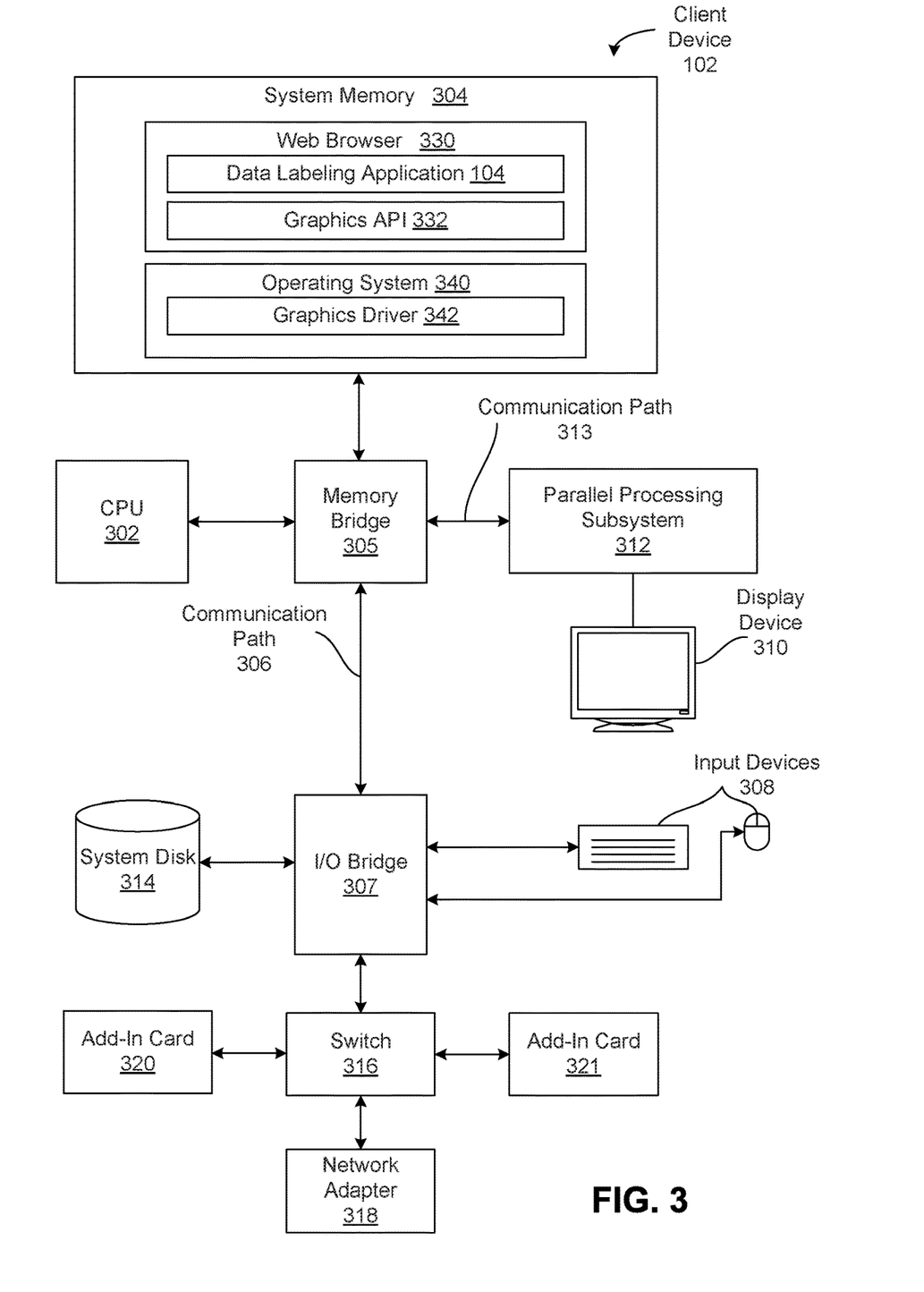
FIG. 3 is a more detailed illustration of the client device of FIG. 1, according to various embodiments.

FIG. 3 is a more detailed illustration of the client device of FIG. 1, according to various embodiments. Although client device 102 is shown for illustrative purposes, it should be understood that server 130 and customer device 110 may include similar physical components as client device 102, but run different software such as server application 134.

As shown, client device 102 includes, without limitation, a central processing unit (CPU) 302 and a system memory 304 coupled to a parallel processing subsystem 312 via a memory bridge 305 and a communication path 313. Memory bridge 304 is further coupled to an I/O (input/output) bridge 307 via a communication path 306, and I/O bridge 307 is, in turn, coupled to a switch 316.

In operation, I/O bridge 307 is configured to receive user input information from input devices 308, such as a keyboard or a mouse, and forward the input information to CPU 302 for processing via communication path 106 and memory bridge 305. Switch 316 is configured to provide connections between I/O bridge 307 and other components of computer system 300, such as a network adapter 318 and various add-in cards 320 and 321.

I/O bridge 307 is coupled to a system disk 314 that may be configured to store content and applications and data for use by CPU 302 and parallel processing subsystem 312. As a general matter, system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, memory bridge 305 may be a Northbridge chip, and I/O bridge 307 may be a Southbridge chip. In addition, communication paths 306 and 313, as well as other communication paths within client device 102, may be implemented using any technically suitable protocols, including, without limitation, AGP (Accelerated Graphics Port), HyperTransport, or any other bus or point-to-point communication protocol known in the art.

In some embodiments, parallel processing subsystem 312 includes a graphics subsystem that delivers pixels to a display device 310 that may be any conventional cathode ray tube, liquid crystal display, light-emitting diode display, or the like. In such embodiments, parallel processing subsystem 312 incorporates circuitry optimized for graphics and video processing, including, for example, video output circuitry. Such circuitry may be incorporated across one or more parallel processing units (PPUs) included within parallel processing subsystem 312. In other embodiments, parallel processing subsystem 312 incorporates circuitry optimized for general purpose and/or compute processing. Again, such circuitry may be incorporated across one or more PPUs included within parallel processing subsystem 312 that are configured to perform such general purpose and/or compute operations. In yet other embodiments, the one or more PPUs included within parallel processing subsystem 312 may be configured to perform graphics processing, general purpose processing, and compute processing operations. System memory 104 includes at least one device driver 103 configured to manage the processing operations of the one or more PPUs within parallel processing subsystem 312.

In various embodiments, parallel processing subsystem 312 may be integrated with one or more of the other elements of FIG. 3 to form a single system. For example, parallel processing subsystem 312 may be integrated with the CPU 302 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 304 could be connected to CPU 302 directly rather than through memory bridge 305, and other devices would communicate with system memory 304 via memory bridge 305 and CPU 302. In other alternative topologies, parallel processing subsystem 312 may be connected to I/O bridge 307 or directly to CPU 302, rather than to memory bridge 305. In still other embodiments, I/O bridge 307 and memory bridge 305 may be integrated into a single chip instead of existing as one or more discrete devices. Lastly, in certain embodiments, one or more components shown in FIG. 3 may not be present. For example, switch 316 could be eliminated, and network adapter 318 and add-in cards 320, 321 would connect directly to I/O bridge 307.

Illustratively, data labeling application 104 that runs in client device 102 is a web application running in a web browser 330. Although shown as a web application for illustrative purposes, data labeling application 104 may be implemented as a native application, mobile application, or other type of software in alternative embodiments. Further, functionality of data labeling application 104 may be distributed across multiple pieces of software in some embodiments. As shown, system memory 316 stores web browser 330 and an operating system 340 on which web browser 330 runs. Operating system 340 may be, e.g., Linux® or Microsoft Windows® and includes a graphics driver 342 that implements a graphics API 332 exposed by the web browser 330 for rendering content, via parallel processing subsystem 312 (and/or CPU 302). For example, graphics API 332 could be WebGL (Web Graphics Library), which is a JavaScript API for rendering interactive 3D and 2D graphics within a compatible web browser. In some embodiments, data labeling application 104 invokes graphics API 332 to render 3D point clouds, 2D images, and/or other types of data, and data labeling application 104 provides tools that facilitate the labeling of data, according to techniques disclosed herein.

In alternate embodiments, system 100 may include any number of client devices 102, any number of servers 130, any number of customer devices 110, any number of memories 304, and any number of processors 302 that are implemented in any technically feasible fashion. Further, client devices 102, servers 130, memory 304, and processor 302 may be implemented via any number of physical resources located in any number of physical locations. For example, memory 304 and processor 302 could be implemented in a cloud computing environment or a distributed computing environment that is accessible to client device 102. The connection topology between the various units in FIGS. 1 and 2 may be modified as desired.

Automatic Benchmarking of Labeling Tasks

Figure 4:
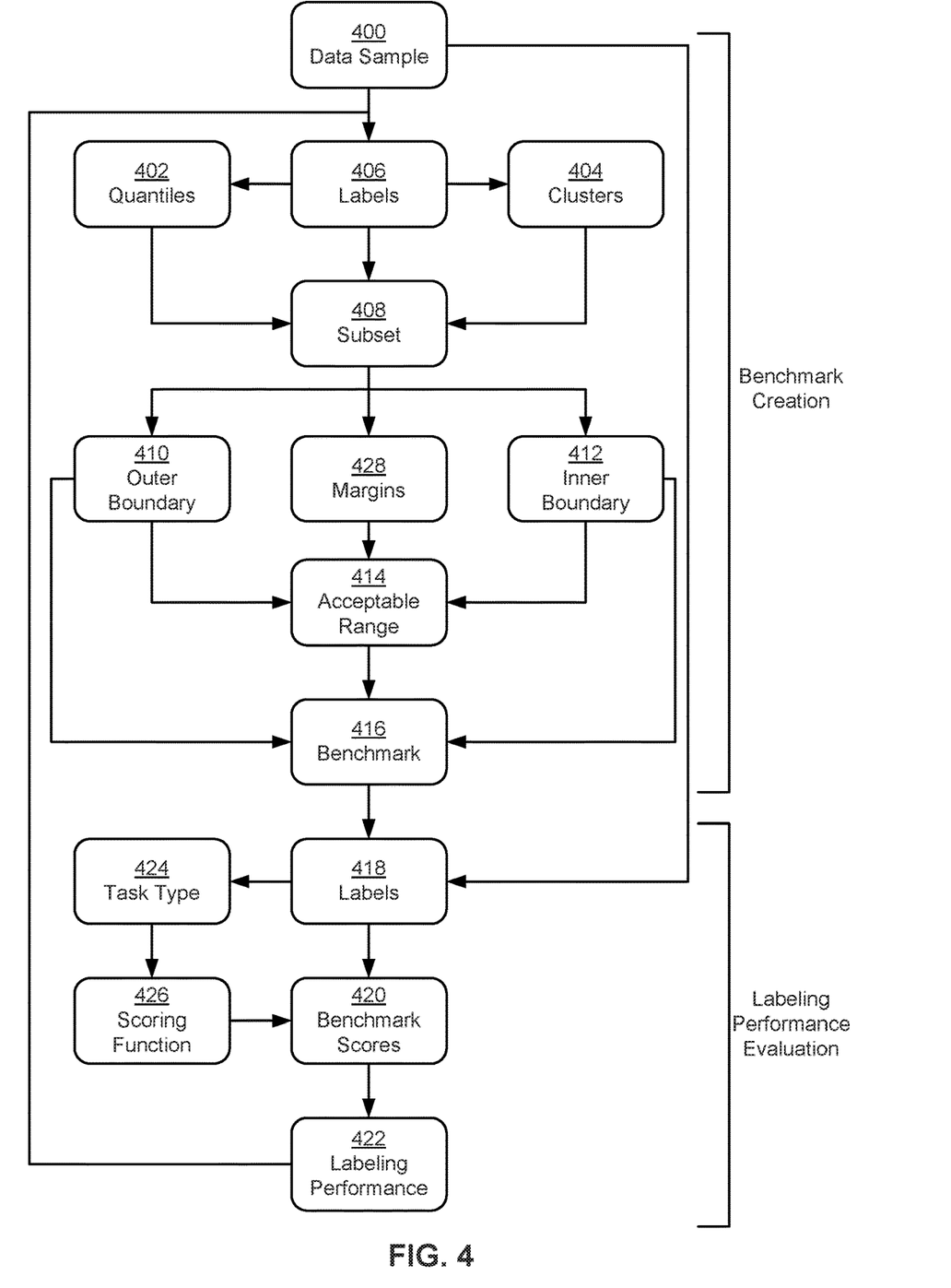
FIG. 4 illustrates the creation of a benchmark for a labeling task, according to various embodiments.

FIG. 4 illustrates the creation of a benchmark 416 for a labeling task, according to various embodiments. The steps performed to create benchmark 416 may be performed by server application 134 and/or other components of server 130. These steps may also, or instead, be performed by customer device 110, one or more client devices $102_{1-N}$, and/or other components of system 100.

As shown, benchmark 416 is related to one or more sets of labels 406 and 418 for a data sample 400. In some embodiments, data sample 400 is used as input into one or more machine learning models, and labels 406 and 418 represent attributes and/or values to be learned by the machine learning model(s) from the input.

For example, data sample 400 includes one or more images, video frames, LIDAR point clouds, radar scans, and/or other types of data collected by sensors on one or more electronic devices and/or vehicles. In this context, labels 406 and 418 can include, but are not limited to, 2D bounding boxes, 3D cuboids, semantic segmentation maps, tags, and/or other indications of the entity types and/or locations of pedestrians, roads, skies, buildings, trees, cars, and/or other objects or entities that are represented in data sample 400. In another example, data sample 400 includes text describing an event, and labels 406 and 418 include one or more categories of events (e.g., conferences, interest group meetings, family events, etc.) to which the event belongs.

As mentioned above, some or all labels 406 and 418 are generated by users interacting with client devices $102_{1-N}$ and/or other components of the system of FIG. 1. As a result, labels 406 and 418 may vary in quality and accuracy, which in turn can impact the performance of machine learning models trained using labels 406 and 418.

To mitigate the adverse impact of inaccurate and/or inconsistent labels 406 and 418 on subsequent machine learning training, validation, and inference, benchmark 416 is created as a "gold standard" against which user-generated labels (e.g., labels 406 and 418) for data sample 400 can be compared. For example, benchmark 416 can be compared to the user-generated labels to generate benchmark scores 420 that characterize the accuracy of the user-generated labels.

In addition, multiple benchmarks may be presented to each user and used to evaluate the user's labeling performance 422 with various types of labeling tasks and/or over time. For example, each new user involved in generating labels via system 100 is initially evaluated using a series of benchmarks to measure the user's labeling performance 422 with respect to various task types (e.g., task type 424) for labeling tasks (e.g., images, video, LIDAR, radar, text, etc.) on system 100. After the user meets a threshold for labeling performance 422, the user is presented with real data samples to label. As the user generates labels for the real data samples, additional benchmarks are added to the user's list of tasks to continuously evaluate the user's labeling performance 422 over time. If the user underperforms with respect to a given type of labeling task, one or more components of system 100 may add training samples and/or educational workflows for that type of labeling task to the user's list of tasks. As the user interacts with the training samples and/or educational workflows, the component(s) may provide instructions for generating accurate labels and/or feedback related to the user's labeling mistakes to allow the user to improve at the labeling task. If the user continues to underperform at the labeling task, then the component(s) may adjust the user's task list to reduce assignments of the same type of labeling task to the user and/or increase assignments of other types of labeling tasks at which the user performs well.

To allow evaluations of labeling performance 422 to scale with the number of users generating the labels and/or the types of labeling tasks or projects, benchmark 416 is automatically generated based on a distribution of certain labels 406 for data sample 400. In some embodiments, labels 406 used in the creation of benchmark 416 are obtained from users with relatively high levels of trustworthiness or established labeling performance 422. For example, labels 406 may be requested from users with established experience and/or accuracy in generating labels for a given task type 424 associated with data sample 400. Some or all labels 406 may also, or instead, be randomly sampled from a larger set of user-generated labels for data sample 400.

Next, a subset 408 of labels 406 is selected for use in creating benchmark 416. In some embodiments, subset 408 is identified to fall within a range of certain quantiles 402 in the distribution of labels 406. For example, quantiles 402 include an upper limit of $75^{th}$ percentile and a lower limit of $25^{th}$ percentile. In turn, portion 408 includes some or all labels 406 that fall between the upper and lower limits.

Subset 408 is also, or instead, selected based on clusters 404 of labels 406. For example, k-means clustering, density-based spatial clustering of applications with noise (DB-SCAN), hierarchical clustering, and/or another clustering technique may be used to produce clusters 404 of labels 406. One or more labels 406 that are closest to the center of each cluster and/or within a certain distance of the center are then selected for inclusion in subset 408.

Label values in subset 408 are used to define one or more parameters related to benchmark 416. These parameters may represent an acceptable range 414 of values associated with "valid" or "accurate" labels for data sample 400.

In some embodiments, the parameters include an outer boundary 410 and an inner boundary 412. For example, labels 406 include bounding boxes, cuboids, and/or other types of polygons that identify the locations, sizes, shapes, and/or orientations of objects in a 2D or 3D scene. Outer boundary 410 includes the union of the polygons in subset 408, and inner boundary 412 includes the intersection of the polygons. In turn, outer boundary 410 and inner boundary 312 define an acceptable range 414 of label values, where benchmark 416 identifies a label as accurate when the label falls within outer boundary 410 and includes some or all of inner boundary 412.

Outer boundary 410 and inner boundary 412 are also, or instead, defined using margins 428 that are applied to individual labels in subset 408. For example, outer boundary 410 may be a certain number of pixels, voxels, points, or another measure of distance outside the polygon defined by a label in subset 408 (e.g., a label that is closest to the center of a cluster). Similarly, inner boundary 412 may be a certain number of pixels, voxels, points, or another measure of distance from the edge of the polygon to the inside of the polygon. As a result, benchmark 416 identifies a label as accurate when the polygon formed by the label falls between outer boundary 410 and inner boundary 412.

Those skilled in the art will appreciate that other techniques may be used to generate benchmark 416 from the distribution of labels 406. For example, benchmark 416 may include a category or class associated with a text-based data sample 400 that includes a natural language description of an event, item, or other entity. After a certain number of labels 406 are generated by trusted and/or random users from the natural language description, the most frequent label is selected as benchmark 416 for data sample 400. Benchmark 416 is also, or instead, generated after the most frequent label exceeds a threshold level of consensus (e.g., 80% of all labels). When labels 406 are split among two or more label values, benchmark 416 can be generated to include all label values with occurrences or proportions that exceed a threshold in labels 406.

Multiple benchmarks for natural language descriptions may additionally be selected to have a balanced distribution of categories or classes, which allows the users' labels 418 to be evaluated with respect to all possible label values. For example, possible label values of "male" and "female" are used with images, text, and/or other types of data samples. While a given collection of data samples (e.g., samples in training data for a machine learning model) can have a highly skewed distribution of label values (e.g., 98% "male" and 2% "female"), benchmark 416 and other benchmarks for the data samples are selected to have an even distribution of label values (i.e., around 50% "male" and 50% "female").

After benchmark 416 is created, benchmark 416 is compared with additional labels 418 for data sample 400 to generate benchmark scores 420 that represent performance metrics for labels 418. For example, benchmark scores 420 may be generated for labels 418 that are obtained from users after benchmark 416 is generated and/or from any labels that were not used to define or create benchmark 416. A higher benchmark score indicates a more accurate label (based on a comparison of the label with benchmark 416), and a lower benchmark score indicates a less accurate label.

In one or more embodiments, benchmark scores 420 are customized to a task type 424 associated with labels 418 and/or data sample 400. For example, task type 424 represents a type of labeling task, a labeling project, and/or another attribute associated with data sample 400 and/or labels 418. More specifically, benchmark scores 420 are calculated using a scoring function 426 that is specific to task type 424. In some embodiments, scoring function 426 includes a user-defined and/or configurable function or formula for calculating benchmark scores 420 from labels 418 and benchmark 416. For example, scoring function 426 includes a component for calculating a "distance" between a label (e.g., labels 418) and benchmark 416 and an optional component for converting the distance into a normalized benchmark score. When benchmark 416 includes one or more classes or categories associated with an entity in data sample 400, the distance may be calculated based on a comparison of the classes or categories with the label. If the label includes some or all of the classes or categories in benchmark 416, then the distance is set to a positive value (e.g., 1 if the label exactly matches benchmark 416 and between 0 and 1 if the label partially matches benchmark 416). If the label does not include any of the classes or categories in benchmark 416, the distance is set to 0.

Continuing with the above example, when benchmark 416 includes outer boundary 410, inner boundary 412, and/or margins 428 associated with a polygon label for data sample 400, the distance may be calculated based on Euclidean distances between vertices and/or edges of the label and benchmark 416. The distance may then be converted into a benchmark score between 0 and 1 for the label (e.g., by setting the benchmark score to 1 when the distance is 0, setting the benchmark score to 0 when the distance exceeds a threshold, and linearly scaling the benchmark score to reflect distances between 0 and the threshold).

Finally, benchmark scores 420 for labels 418 are used to update labeling performance 422 for the corresponding users. For example, the benchmark score for a user's label for data sample 402 may be aggregated with other benchmark scores for the same task type 424 into an overall benchmark score for task type 424. In the aggregation, more recent benchmark scores can be weighted more heavily than less recent benchmark scores to allow the overall benchmark score to better reflect the user's latest behavior or performance. Multiple benchmark scores and/or overall benchmark scores may also be generated and/or updated to characterize or track the user's labeling performance 422 with respect to different types of labeling tasks. Additional benchmarks, training samples, educational flows, and/or labeling tasks may then be added to the user's list of tasks based on the benchmark scores and/or labeling performance 422, as discussed above.

Benchmark 416 can additionally be generated in instances where a high level of consensus is not found. In these instances, the lack of consensus is indicative of a difficult task instead of a task with an ambiguous answer. To determine whether or not data sample 400 represents a difficult task, labels 406 for data sample 400 are grouped or divided by labeling performance 422 of the users that generated labels 406. If labels 406 have high consensus for a first group of users with labeling performance 422 that exceeds a threshold and low consensus for a second group of users with labeling performance 422 that falls below the threshold, data sample 400 is identified as representing a difficult task. In turn, benchmark 416 is generated from one or more high-consensus labels 406 from the first group of users. Conversely, if a threshold for labeling performance 422 cannot be used to divide labels 406 into a high-consensus subset for high-performing users and a low-consensus subset for lower-performing users, generation of benchmark 416 from data sample 400 is omitted.

After benchmark 416 is created, benchmark scores 420 for additional labels 418 generated by users are monitored to determine if benchmark 416 is useful at assessing labeling performance 422 of the users. If a significant proportion (e.g., more than a threshold percentage) of labels 418 are incorrect or have benchmark scores 420 that fall below a threshold, benchmark 416 is flagged for manual review. An administrator and/or another user that verifies benchmarks may perform the manual review via a dashboard and/or another type of user interface. For example, the user interface includes statistics associated with benchmark 416, such as the proportion of users with benchmark scores 420 below the threshold, an average or median benchmark score for benchmark 416, and/or any threshold for labeling performance 422 that results in a high-consensus subset of labels 418 for high-performing users and a low-consensus subset of labels 406 for lower-performing users. The user can interact with the user interface to confirm the legitimacy of benchmark 416 (e.g., when data sample 400 represents a difficult task) or disable benchmark 416 (e.g., when data sample 400 represents an ambiguous task or benchmark 416 is incorrect). If benchmark 416 is disabled, benchmark scores 420 for users that have completed benchmark 420 are removed to prevent those benchmark scores 420 from adversely impacting the users' overall labeling performance 422.

Figure 5:
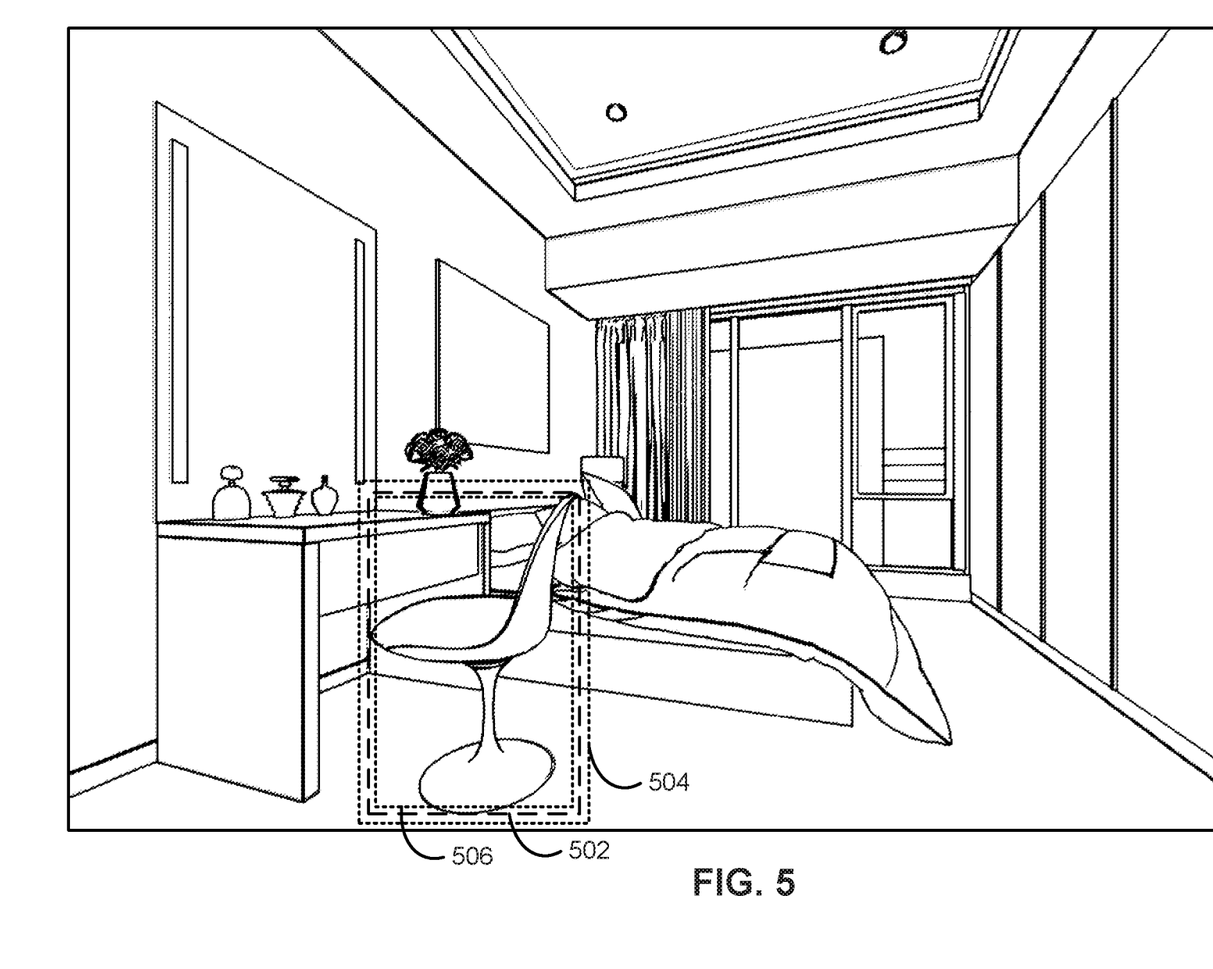
FIG. 5 illustrates an example screenshot of a user interface (UI) displaying a benchmark, according to various embodiments.

FIG. 5 illustrates an example screenshot of a user interface (UI) displaying a benchmark 502, according to various embodiments. As shown, benchmark 502 includes a rectangular bounding box for an object (i.e., a chair) in a 2D image or scene.

As discussed above, benchmark 502 may be generated from one or more existing labels for the object. For example, benchmark 502 may be set to a specific label, such as a label that is closest to the center of a cluster of existing labels. In another example, benchmark 502 may include the median, average, or another aggregation of a set of labels for the object.

The UI of FIG. 5 also includes two margins 504-506 associated with benchmark 502. Margin 504 represents an outer boundary for benchmark 502, and margin 506 represents an inner boundary for benchmark 502. Margins 504-506 define a range of acceptable values for "accurate" labels of the object. For example, margins 504-506 may indicate the portion of the image or scene within which a valid label for the object can be generated.

As with benchmark 502, margins 504-506 may be generated from one or more existing labels for the object. For example, margin 504 may represent the union of a set of labels for the object, and margin 506 may represent the intersection of the same set of labels. In another example, margins 504-506 may be defined to be a certain number of pixels (or another measure of distance) away from benchmark 502.

Figure 6:
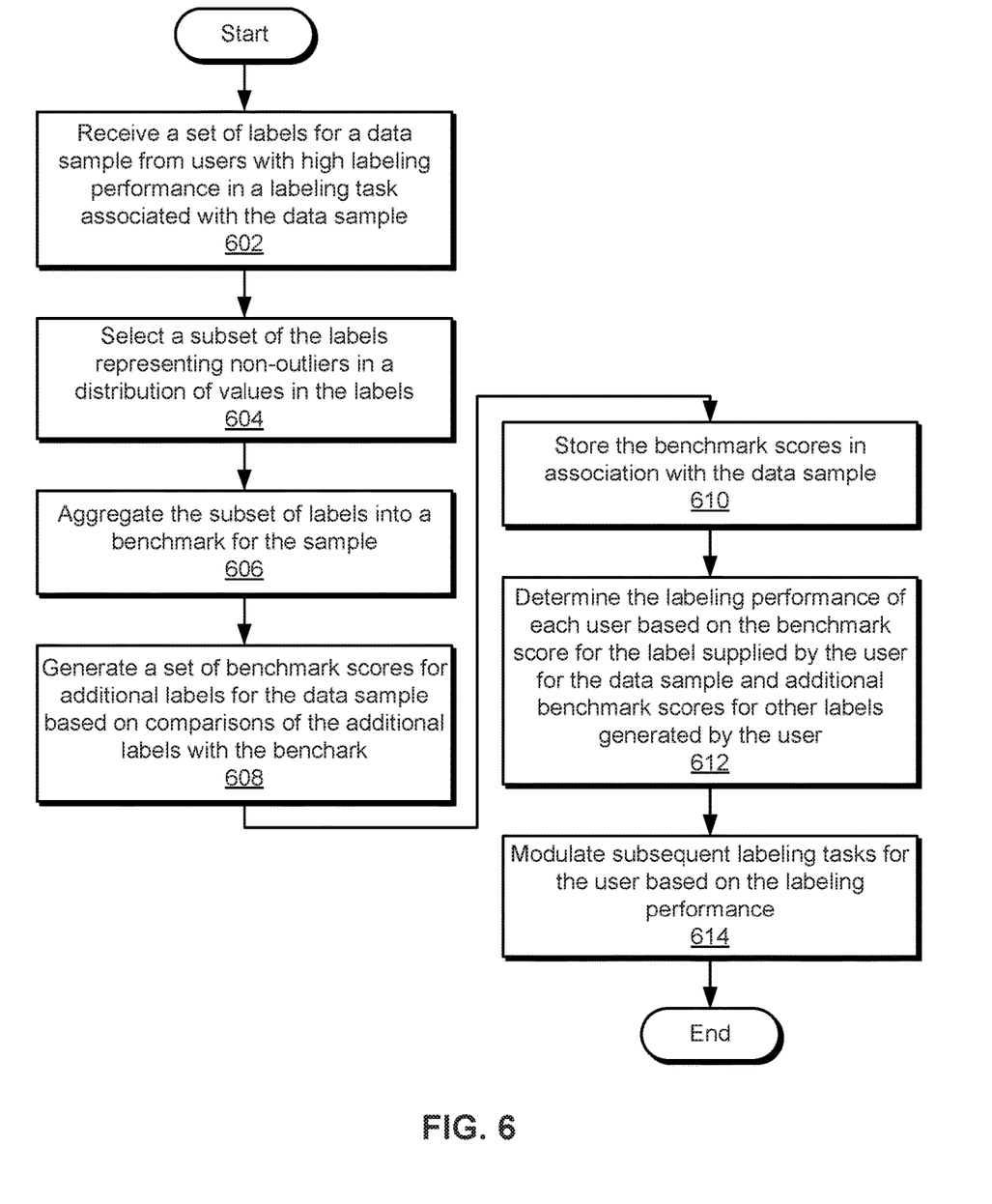
FIG. 6 is a flow diagram of method steps for evaluating labeled data, according to various embodiments.

FIG. 6 is a flow diagram of method steps for evaluating labeled data, according to various embodiments. Although the method steps are described with reference to the system of FIGS. 1 and 3, persons skilled in the art will understand that any system may be configured to implement the method steps, in any order, in other embodiments.

As shown, server 130 receives 602 a set of labels for a data sample from users with high labeling performance in a labeling task associated with the data sample. For example, server 130 obtains the labels from users with significant experience in performing the labeling task and/or high benchmark scores for the labeling task. Server 130 also, or instead, obtains some or all labels from a randomly selected set of users.

Next, server 130 selects 604 a subset of the labels representing non-outliers in a distribution of values in the labels. For example, server 130 limits the subset of the labels to fall between a lower quantile and an upper quantile in the distribution of values. In another example, server 130 selects one or more labels that are closest to a center of a cluster generated from the set of labels. In a third example, server 130 selects one or more labels that are within a certain distance of the center of the cluster. In a fourth example, server 130 selects the subset of the labels from a first group of users with labeling performance that exceeds a threshold when the first group of users has high consensus in labels for the data sample and a second group of users with labeling performance that falls below the threshold has low consensus in labels for the data sample.

Server 130 also aggregates 606 the subset of labels into a benchmark for the sample. For example, server 130 generates an outer boundary of the benchmark from a union of a set of polygons in the subset of labels and an inner boundary of the benchmark from the intersection of the set of polygons. In another example, server 130 determines a range of acceptable values represented by the benchmark based on one or more margins associated with each of the labels in the subset. In a third example, server 130 aggregates one or more label values (e.g., classes, categories, etc.) with high consensus within the subset of labels into the benchmark.

Server 130 then generates 608 a set of benchmark scores for additional labels for the data sample based on comparisons of the additional labels with the benchmark. Server 130 additionally stores 610 the benchmark scores in association with the data sample. For example, server 132 and/or another component add the data sample to lists of labeling tasks for a number of users (e.g., users involved in generating labels for a task type associated with the data sample). After a label for the data sample is generated by a user, server 132 uses the benchmark to evaluate the accuracy of the user's label. During the evaluation, server 130 identifies a user-generated label for the data sample as accurate when the label falls within the outer boundary and includes the inner boundary of the benchmark and/or stays within the margins for one or more labels used to create the benchmark. Server 130 also, or instead, generates a benchmark score for a label for the data sample based on a scoring function associated with a labeling task for the data sample, which includes a component for calculating a distance between the label and the benchmark (e.g., when some or all of the label falls outside the boundaries and/or margins associated with the benchmark). After a benchmark score is calculated between the benchmark and the label generated by a given user, server 130 and/or another component store the benchmark score with identifiers for the user, the user's label, and/or the data sample. Consequently, the benchmark scores represent performance metrics for labeling the data sample by a set of users.

Server 130 determines 612 the labeling performance of each user based on the benchmark score for the label supplied by the user for the data sample and additional benchmark scores for other labels generated by the user. For example, server 130 combines multiple benchmark scores for the same user and a given type of labeling task into an overall benchmark score for the user.

Finally, server 130 and/or another component modulate 614 subsequent labeling tasks for the user based on the labeling performance. For example, the component may reduce assignment of a type of labeling task associated with the data sample (e.g., drawing bounding boxes or cuboids around certain types of objects, classifying text, etc.) when the corresponding user's benchmark score for the data sample and/or overall benchmark score for the labeling task fall below a threshold. In another example, the component may assign a training sample for the labeling task to the user based on the benchmark score(s).

In sum, the disclosed techniques generate benchmarks based on distributions of existing labels for data samples. The labels are selected from users with high performance in labeling tasks associated with the data samples and/or randomly sampled from a larger set of labels. The benchmarks are automatically generated from non-outliers in the distribution of the selected labels. Boundaries and/or scoring functions associated with the benchmarks are used to calculate benchmark scores for additional labels for the same data samples, and the benchmark scores are used to assess and/or improve the labeling performance of users that generated the labels.

Unlike conventional benchmarks, which are manually selected or defined by data scientists, knowledge experts, or other "trusted" users, the disclosed embodiments utilize a number of techniques to automatically generate benchmarks from existing labels. These automatically generated benchmarks allow evaluation of labeling performance to scale with the number of users involved in labeling tasks and/or the types of labeling tasks or projects. Moreover, continuous evaluation of the users' labeling performance and adjustment of the users' labeling tasks based on the labeling performance improve the quality and accuracy of the labels. In turn, machine learning models that are trained or validated using the labels have better performance and/or faster convergence than machine learning models that are trained or validated using noisy and/or inaccurate labels. Consequently, the disclosed techniques provide technological improvements in the generation of labeled data for machine learning and/or the training, validation, and execution of machine learning models.

1. In some embodiments, a computer-implemented method for evaluating labeled data comprises selecting, from a set of labels for a data sample, a subset of the labels representing non-outliers in a distribution of values in the set of labels; aggregating the subset of the labels into a benchmark for the data sample; generating, based on a comparison between the benchmark and an additional label, a benchmark score associated with the additional label for the data sample; and generating a set of performance metrics for labeling the data sample based on the benchmark score.

2. The computer-implemented method of clause 1, wherein the additional label is provided by a user, and wherein generating the set of performance metrics comprises determining a labeling performance of the user based on the benchmark score and additional benchmark scores for other labels generated by the user; and modulating subsequent labeling tasks transmitted to the user based on the labeling performance.

3. The computer-implemented method of any of clauses 1-2, wherein modulating the subsequent labeling tasks transmitted to the user comprises at least one of when the benchmark score is below a threshold score, reducing assignment of a type of labeling task associated with the data sample for the user; and assigning a training sample for the labeling task to the user based on the first benchmark score.

4. The computer-implemented method of any of clauses 1-3, wherein selecting the subset of the labels comprises identifying, from the set of labels, one or more labels that fall between a lower quantile and an upper quantile of the distribution of values, wherein the subset of the labels includes only the one or more labels.

5. The computer-implemented method of any of clauses 1-4, wherein selecting the subset of the labels comprises selecting one or more labels that are closest to a center of a cluster generated from the set of labels.

6. The computer-implemented method of any of clauses 1-5, wherein selecting the subset of the labels comprises selecting one or more labels that are within a distance of a center of a cluster generated from the set of labels.

7. The computer-implemented method of any of clauses 1-6, wherein aggregating the subset of the labels into the benchmark for the data sample comprises generating an outer boundary of the benchmark from a union of a set of polygons in the subset of the labels; and generating an inner boundary of the benchmark from the intersection of the set of polygons.

8. The computer-implemented method of any of clauses 1-7, wherein generating the benchmark score associated with the additional label comprises identifying the additional label as accurate when the additional label falls within the outer boundary and includes the inner boundary.

9. The computer-implemented method of any of clauses 1-8, wherein aggregating the subset of the labels into the benchmark for the data sample comprises determining a range of acceptable values represented by the benchmark based on one or more margins associated with the subset of the labels.

10. The computer-implemented method of any of clauses 1-9, wherein generating the benchmark score associated with the additional label comprises calculating the benchmark score for the label based on a scoring function associated with a labeling task for the data sample.

11. In some embodiments, a non-transitory computer readable medium stores instructions that, when executed by a processor, cause the processor to perform the steps of selecting, from a set of labels for a data sample, a subset of the labels representing non-outliers in a distribution of values in the set of labels; aggregating the subset of the labels into a benchmark for the data sample; generating, based on a comparison between the benchmark and an additional label, a benchmark score associated with the additional label for the data sample; and generating a set of performance metrics for labeling the data sample based on the benchmark score.

12. The non-transitory computer readable medium of clause 11, wherein the steps further comprise receiving the set of labels from a set of users with a high labeling performance in a labeling task associated with the data sample.

13. The non-transitory computer readable medium of any of clauses 11-12, wherein selecting the subset of the labels comprises identifying, from the set of labels, one or more labels that fall between a lower quantile and an upper quantile of the distribution of values, wherein the subset of the labels includes only the one or more labels.

14. The non-transitory computer readable medium of any of clauses 11-13, wherein selecting the subset of the labels comprises selecting one or more labels that are closest to a center of a cluster generated from the set of labels.

15. The non-transitory computer-readable medium of any of clauses 11-14, wherein aggregating the subset of the labels into the benchmark for the data sample comprises generating an outer boundary of the benchmark from a union of a set of polygons in the subset of the labels; and generating an inner boundary of the benchmark from the intersection of the set of polygons.

16. The non-transitory computer-readable medium of any of clauses 11-15, wherein generating the benchmark score associated with the additional label comprises identifying the additional label as accurate when the additional label falls within the outer boundary and includes the inner boundary.

17. The non-transitory computer-readable medium of any of clauses 11-16, wherein aggregating the subset of the labels into the benchmark for the data sample comprises determining a range of acceptable values represented by the benchmark based on one or more margins associated with the subset of the labels.

18. The non-transitory computer readable medium of any of clauses 11-17, wherein the subset of the labels is selected based on high consensus among a first group of users with labeling performance that exceeds a threshold and low consensus among a second group of users with labeling performance that falls below the threshold.

19. The non-transitory computer readable medium of any of clauses 11-18, wherein generating the benchmark score associated with the additional label comprises calculating the benchmark score based on a scoring function that includes a distance between the label and the benchmark.

20. In some embodiments, a system comprises a memory that stores instructions, and a processor that is coupled to the memory and, when executing the instructions, is configured to select, from a set of labels for a data sample, a subset of the labels representing non-outliers in a distribution of values in the set of labels; aggregate the subset of the labels into a benchmark for the data sample; generate, based on a comparison between the benchmark and an additional label, a benchmark score associated with the additional label for the data sample; and generate a set of performance metrics for labeling the data sample based on the benchmark score.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for evaluating labeled data, comprising:
   selecting, from a set of labels for a data sample, a subset of the labels representing non-outliers in a distribution of values in the set of labels;
   aggregating the subset of the labels into a benchmark as a range of values that are valid for the data sample, wherein the aggregating includes,
      generating an outer boundary of the benchmark from a union of a set of polygons in the subset of the labels, and
      generating an inner boundary of the benchmark from an intersection of the set of polygons;
   generating, based on a comparison between the range of values of the benchmark and an additional label, a benchmark score associated with the additional label for the data sample; and
   generating a set of performance metrics for labeling the data sample based on the benchmark score.

2. The computer-implemented method of claim 1, wherein the additional label is provided by a user, and wherein generating the set of performance metrics comprises:
   determining a labeling performance of the user based on the benchmark score and additional benchmark scores for other labels generated by the user; and
   modulating subsequent labeling tasks transmitted to the user based on the labeling performance.

3. The computer-implemented method of claim 2, wherein modulating the subsequent labeling tasks transmitted to the user comprises at least one of:
   when the benchmark score is below a threshold score, reducing assignment of a type of labeling task associated with the data sample for the user; and
   assigning a training sample for the labeling task to the user based on the benchmark score associated with the additional label.

4. The computer-implemented method of claim 1, wherein selecting the subset of the labels comprises identifying, from the set of labels, one or more labels that fall between a lower quantile and an upper quantile of the distribution of values, wherein the subset of the labels includes only the one or more labels.

5. The computer-implemented method of claim 1, wherein selecting the subset of the labels comprises selecting one or more labels that are closest to a center of a cluster generated from the set of labels.

6. The computer-implemented method of claim 1, wherein selecting the subset of the labels comprises selecting one or more labels that are within a distance of a center of a cluster generated from the set of labels.

7. The computer-implemented method of claim 1, wherein generating the benchmark score associated with the additional label comprises identifying the additional label as accurate when the additional label falls within the outer boundary and includes the inner boundary.

8. The computer-implemented method of claim 1, wherein aggregating the subset of the labels into the range of values of the benchmark for the data sample is based on one or more margins associated with the subset of the labels.

9. The computer-implemented method of claim 1, wherein generating the benchmark score associated with the additional label comprises calculating the benchmark score for the label based on a scoring function associated with a labeling task for the data sample.

10. A non-transitory computer readable medium storing instructions that, when executed by a processor, cause the processor to perform the steps of:
   selecting, from a set of labels for a data sample, a subset of the labels representing non-outliers in a distribution of values in the set of labels;
   aggregating the subset of the labels into a benchmark as a range of values that are valid for the data sample, wherein the aggregating includes,
      generating an outer boundary of the benchmark from a union of a set of polygons in the subset of the labels, and
      generating an inner boundary of the benchmark from an intersection of the set of polygons;
   generating, based on a comparison between the range of labels of the benchmark and an additional label, a benchmark score associated with the additional label for the data sample; and
   generating a set of performance metrics for labeling the data sample based on the benchmark score.

11. The non-transitory computer readable medium of claim 10, wherein the steps further comprise receiving the set of labels from a set of users with a high labeling performance in a labeling task associated with the data sample.

12. The non-transitory computer readable medium of claim 10, wherein selecting the subset of the labels comprises identifying, from the set of labels, one or more labels that fall between a lower quantile and an upper quantile of the distribution of values, wherein the subset of the labels includes only the one or more labels.

13. The non-transitory computer readable medium of claim 10, wherein selecting the subset of the labels comprises selecting one or more labels that are closest to a center of a cluster generated from the set of labels.

14. The non-transitory computer-readable medium of claim 10, wherein generating the benchmark score associated with the additional label comprises identifying the additional label as accurate when the additional label falls within the outer boundary and includes the inner boundary.

15. The non-transitory computer-readable medium of claim 10, wherein aggregating the subset of the labels into the range of values of the benchmark for the data sample is based on one or more margins associated with the subset of the labels.

16. The non-transitory computer readable medium of claim 10, wherein the subset of the labels is selected based on high consensus among a first group of users with labeling performance that exceeds a threshold and low consensus among a second group of users with labeling performance that falls below the threshold.

17. The non-transitory computer readable medium of claim 10, wherein generating the benchmark score associated with the additional label comprises calculating the benchmark score based on a scoring function that includes a distance between the label and the benchmark.

18. A system, comprising:
   a memory that stores instructions, and
   a processor that is coupled to the memory and, when executing the instructions, is configured to:
      select, from a set of labels for a data sample, a subset of the labels representing non-outliers in a distribution of values in the set of labels;
      aggregate the subset of the labels into a benchmark as a range of values that are valid for the data sample, wherein the aggregating includes,
         generating an outer boundary of the benchmark from a union of a set of polygons in the subset of the labels, and
         generating an inner boundary of the benchmark from an intersection of the set of polygons;
      generate, based on a comparison between the range of values of the benchmark and an additional label, a benchmark score associated with the additional label for the data sample; and
      generate a set of performance metrics for labeling the data sample based on the benchmark score.

* * * * *